Patented Dec. 1, 1936

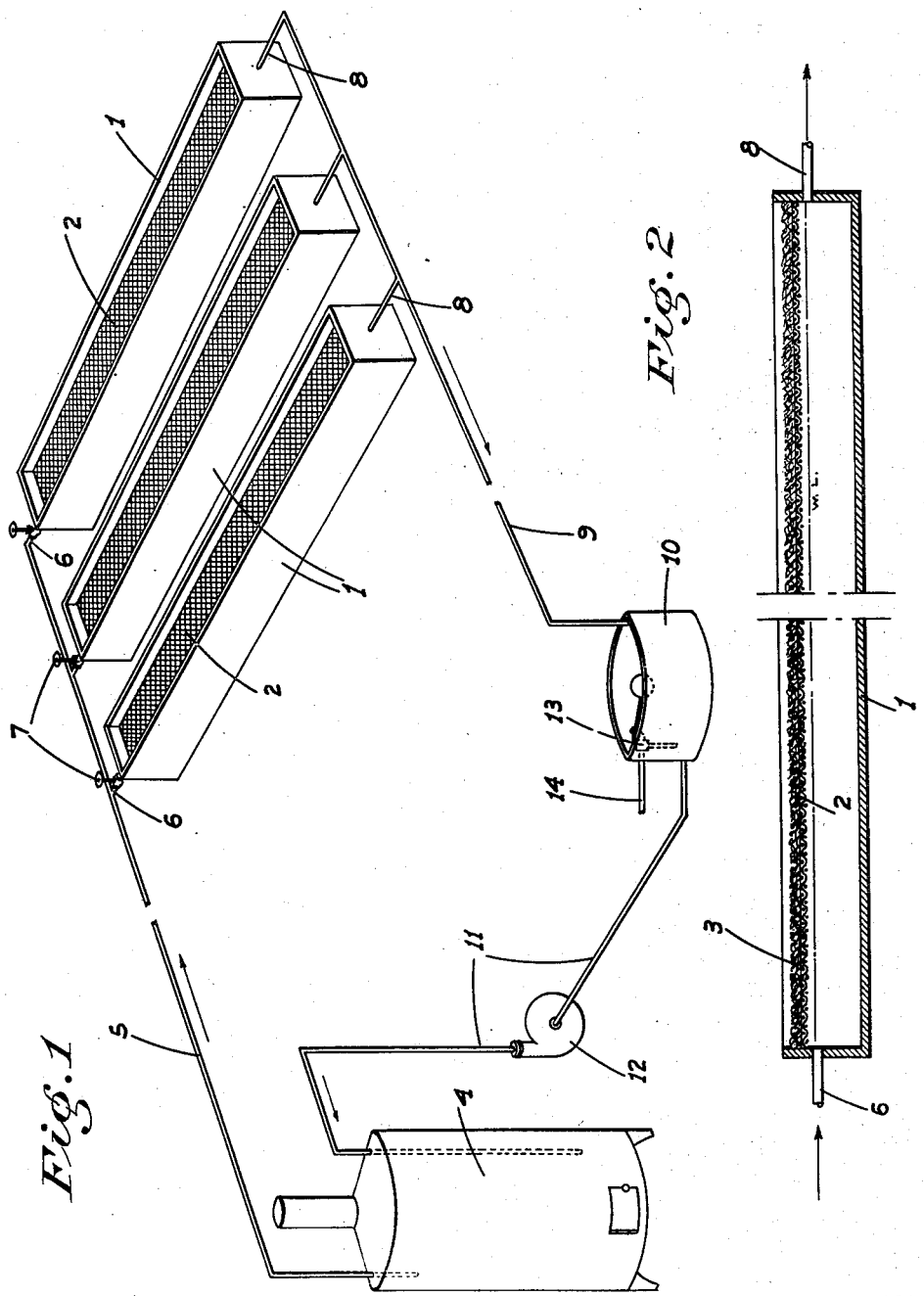

2,062,755

UNITED STATES PATENT OFFICE 2,062,755

SYSTEM OF WATER CULTURE

Frank F. Lyons, Lodi, and Ernest Brundin, Montebello, Calif.

Application March 4, 1936, Serial No. 67,024

9 Claims. (Cl. 47—16)

This invention relates generally to the art of growing plants, without the use of soil, by means of water culture and the invention is specifically directed to a system of carrying on the water culture growth of plants on a relatively large commercial scale.

Heretofore, in the growth of plants by the water culture method, it has been the practice to employ individual troughs, each of which had to be cared for separately, and in which the water containing the soluble plant food remained static.

Also in this individual trough method, the water level in each trough must be individually controlled and the mineral content in the water in each trough must be separately tested and supplied in the correct proportion.

Furthermore, in our own work in the practical development of this new method, we have determined that much more effective results can be obtained by heating the water and maintaining it at a uniform predetermined temperature and this cannot be done economically in the individually maintained troughs.

For these several reasons the so-called individual trough system has heretofore made the growth of plants by water culture too expensive for practical commercial purposes.

In order to accomplish the desired heating and circulation of the water and to control the level; test and supply the mineral content of all the troughs at one and the same time and thus render the water culture of plants an economical and practical success, the main objective of our invention is to provide a system whereby a great many water culture troughs may be continuously cared for and serviced in the above manner as a unit.

A further object of the invention is to produce a simple and inexpensive system and yet one which will be exceedingly effective for the purpose for which it is designed.

These objects we accomplish by means of such structure and relative arrangement of parts as will fully appear by a perusal of the following specification and claims.

In the drawing similar characters of reference indicate corresponding parts in the several views:

Fig. 1 is a diagrammatic perspective view of the equipment employed to practice our system of water culture.

Fig. 2 is a fore-shortened sectional elevation of one of the troughs.

Referring now more particularly to the characters of reference on the drawing, the numeral 1 indicates a plurality of troughs, preferably formed of redwood, and set in spaced parallel relation. Each trough is provided with a mesh screen 2 mounted in the trough slightly above the water level as illustrated in Fig. 2. This screen supports a layer of peat moss, straw or the like 3 which serves as the seed bed; the roots of the plants depending from the seed bed through the screen into the water in the trough. The plants obtain the elements necessary to their growth through their roots from water and the minerals placed in the water and from the surrounding air.

From a central heating boiler 4, which is preferably thermostatically controlled, the water, heated to a predetermined temperature, flows through a feed pipe 5 which may be suitably insulated to prevent undue heat loss. From this supply pipe, the heated water flows through lateral pipes 6, each having a valve 7, into the water culture troughs. These lateral pipes discharge into one end of the troughs at a level immediately below the screens. At their other end, the troughs are provided with overflow pipes 8 at any selected water level; said overflow pipes discharging into a common return pipe 9.

This return pipe feeds, by gravity, into an open sump or storage reservoir 10. A boiler feed pipe 11, having a pump 12 interposed therein, carries the water from the sump to the boiler. In order to maintain a given volume of water in the system at all times, a float actuated valve 13 of common character is provided in connection with a fresh water supply pipe 14 leading to the sump or reservoir 10.

Thus, a complete circulatory system for the water is provided and the temperature thereof is centrally controlled at the boiler; the water level in each trough is automatically maintained at the desired level by the position of the overflow pipes 8; the open sump or reservoir 10 provides a central point for testing the acidity, alkalinity and nutritive content of the water and for the supplying of the mineral elements to the water as needed for all the troughs. The float controlled valve 13 automatically maintains the volume of water in the system constant.

By employing this system of water culture, minerals in optimum proportion to produce maximum plant growth may be maintained in water of the most beneficial temperature from a central point. In practice, the sump, pump, and boiler will be located relatively close together and may be remote from the troughs if desired.

Our improved system so reduces the cost of growing plants by means of water culture as to permit the commercial growth of vegetables, etc. in this manner. Vegetable plants grown by means of water culture produce a yield twenty times as great as that of field grown plants and as they may be grown to yield in off-season, the vegetables bring exceedingly high market prices.

We claim also that many other advantages are to be derived from the heating and circulating of the water and we will here relate a few of them.

Heretofore it has been assumed that the better growth of hot house plants was induced by the heating of the air of the house. Our experiments show, however, that this is not necessarily so, and that the heating of the air naturally results in heating the soil about the roots of the plants and it is this which is the main factor in producing hot house growth. By heating the root growth alone through the medium of our circulating heated water, fine growth of the plant is encouraged and by allowing the atmosphere to remain fairly normal around the foliage, there is a better setting of fruit, hand pollination is not necessary and thriftier, hardier foliage is generally the rule.

Also, by the circulation of the water there is a positive mechanical diffusion of the minerals which is of prime importance. In the individual trough method where the water is static, the iron in the applied minerals diffuses so slowly that often it will react with other elements and become an insoluble and precipitate before it diffuses to all parts of the trough. In our method, however, it is positively and mechanically diffused to all parts of each trough by the slowly circulating warm water. The circulation of water also provides an effective means for the slow constant addition of minerals to the water as needed.

From the foregoing description it will be readily seen that we have produced such a system as substantially fulfills the objects of the invention as set forth herein.

While this specification sets forth in detail the present and preferred construction of the system, still in practice such deviations from such detail may be resorted to as do not form a departure from the spirit of the invention, as defined by the appended claims.

Having thus described our invention, what we claim as new and useful and desire to secure by Letters Patent is:

1. In the water culture of plants, a plurality of troughs, seed beds disposed in each trough and spaced from the bottom thereof, means to circulate water containing certain mineral elements through the troughs while maintaining a constant water level therein below the seed beds, and central heating means to maintain the water in the troughs at a given temperature.

2. In the water culture of plants, a plurality of troughs, seed beds disposed in each trough and spaced from the bottom thereof, and a pipe system to circulate water, containing certain mineral elements, through the troughs while maintaining a constant water level therein, said system including means other than the troughs to enable a quantity of the circulating water in the system to be withdrawn for the purpose of testing.

3. In the water culture of plants, a plurality of troughs, seed beds disposed in each trough and spaced from the bottom thereof, a pipe system to circulate water containing certain mineral elements through the troughs while maintaining a constant water level therein below the seed beds, means to heat the water prior to circulation through the troughs and means to maintain a given volume of water in the system.

4. A structure as in claim 3 in which said last named means includes a reservoir and a float actuated water supply inlet valve feeding into the reservoir.

5. In the water culture of plants, a plurality of troughs, seed beds disposed in each trough and spaced from the bottom thereof, a pipe system to circulate water containing certain mineral elements through the troughs while maintaining a constant water level therein below the seed beds, a boiler disposed in the pipe system to heat the water circulating through the troughs, a reservoir interposed in the pipe system and a pump in the system to deliver the water from the reservoir to the boiler.

6. In the water culture of plants, a plurality of troughs, seed beds disposed in each trough and spaced from the bottom thereof, a pipe system to circulate water containing certain mineral elements through the troughs while maintaining a constant water level therein below the seed beds, a boiler disposed in the system to heat the water circulating through the troughs, and an open reservoir in the system to enable water to be withdrawn from the system for testing and for the supply of additional mineral elements at a point other than at the troughs.

7. A structure as in claim 6 in which the boiler and reservoir are mounted in close proximity to each other.

8. That method of water culture of plants in a plurality of separate troughs comprising the steps of circulating water containing certain mineral elements through the water culture troughs, heating the water at a central point and testing the water at a central point for mineral content.

9. That method of water culture of plants in a plurality of separate troughs comprising the steps of circulating water containing certain mineral elements through the troughs, maintaining the water in the troughs at a constant level, and heating the water as it circulates.

FRANK F. LYONS.
ERNEST BRUNDIN.